United States Patent
Sestok et al.

(10) Patent No.: US 8,374,261 B2
(45) Date of Patent: Feb. 12, 2013

(54) METHOD AND APPARATUS FOR DOPPLER ESTIMATION IN ORTHOGONAL FREQUENCY-DIVISION MULTIPLEXING (OFDM)

(75) Inventors: Charles Sestok, Dallas, TX (US); Jaiganesh Balakrishnan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 695 days.

(21) Appl. No.: 12/512,784

(22) Filed: Jul. 30, 2009

(65) Prior Publication Data

US 2011/0026616 A1 Feb. 3, 2011

(51) Int. Cl.
*H04K 1/10* (2006.01)
(52) U.S. Cl. ........................ 375/260; 375/347
(58) Field of Classification Search .................. 375/260, 375/267, 346, 347
See application file for complete search history.

(56) References Cited

U.S. PATENT DOCUMENTS

| | | | |
|---|---|---|---|
| 2008/0304605 A1* | 12/2008 | Aziz et al. | 375/347 |
| 2009/0141819 A1* | 6/2009 | Hojen-Sorensen et al. | 375/260 |
| 2009/0168930 A1* | 7/2009 | Li et al. | 375/346 |
| 2010/0008443 A1* | 1/2010 | Casamajou | 375/267 |

* cited by examiner

*Primary Examiner* — Leon-Viet Nguyen
(74) *Attorney, Agent, or Firm* — W. James Brady; Frederick J. Telecky, Jr.

(57) ABSTRACT

A method and apparatus for estimating Doppler channel in an Orthogonal Frequency-Division Multiplexor. The method includes selecting a continuation pilot, generating a channel estimation, filtering the continual pilot with at least one channel estimator, computing the error between the channel estimation and the filtered channel estimates, averaging the error across continual pilot carriers and over time, estimating noise variance, corrects average error utilizing the estimated noise variance to generate an estimate of the overall channel estimator error, and setting the filter cutoff to minimum estimation error.

6 Claims, 8 Drawing Sheets

METHOD AND APPARATUS FOR DOPPLER ESTIMATION IN ORTHOGONAL FREQUENCY-DIVISION MULTIPLEXING (OFDM)

BACKGROUND OF THE INVENTION

1. Field of the Invention

Embodiments of the present invention generally relate to a method and apparatus for a Doppler estimation algorithm for Orthogonal Frequency-Division Multiplexing (OFDM).

2. Description of the Related Art

The DTV2000 chip is intended to be a high-performance DVB-H receiver. As such, it is capable of receiving video reliably in a highly mobile environment. The mobility introduces channel fading that disrupts the orthogonally of the Orthogonal Frequency-Division Multiplexing (OFDM) carriers (or tones) in the DVB-H signal. An inter-carrier interference (ICI) cancellation algorithm included in the receiver enables reliable performance in these challenging conditions. The ICI canceller compensates for the interference between neighboring OFDM carriers by subtracting estimates of the ICI from neighboring tones before equalization via the traditional single-tap frequency domain equalizer (FEQ).

The ICI cancellation algorithm improves receiver performance when the channel has a high Doppler spread. In channels with low Doppler spreads, the cancellation algorithm degrades performance. At such low Doppler frequencies, the ICI estimates are below the noise floor and may be noise-dominated. When fed corrupt ICI estimates, the ICI cancellation algorithm degrades receiver performance.

Therefore, there is a need for an improved method and apparatus for a Doppler estimation algorithm for OFDM.

SUMMARY OF THE INVENTION

Embodiments of the present invention relate to a method and apparatus for Doppler estimation in Orthogonal Frequency-Division Multiplexing (OFDM). The method includes for estimating Doppler channel in an Orthogonal Frequency-Division Multiplexor. The method includes selecting a continuation pilot, generating a channel estimation, filtering the continual pilot with at least one channel estimator, computing the error between the channel estimation and the filtered channel estimates, averaging the error across continual pilot carriers and over time, estimating noise variance, corrects average error utilizing the estimated noise variance to generate an estimate of the overall channel estimator error, and setting the filter cutoff to minimum estimation error.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

It should be noted that the methods described me be carried out by a Digital Signal Processor (DSP). Also, a computer readable medium is any medium a computer utilizes to, for example, read, write, execute, archive, store data.

FIG. 4A-I is an embodiment of simulation results for the Doppler estimator.

DETAILED DESCRIPTION

Figure 1:
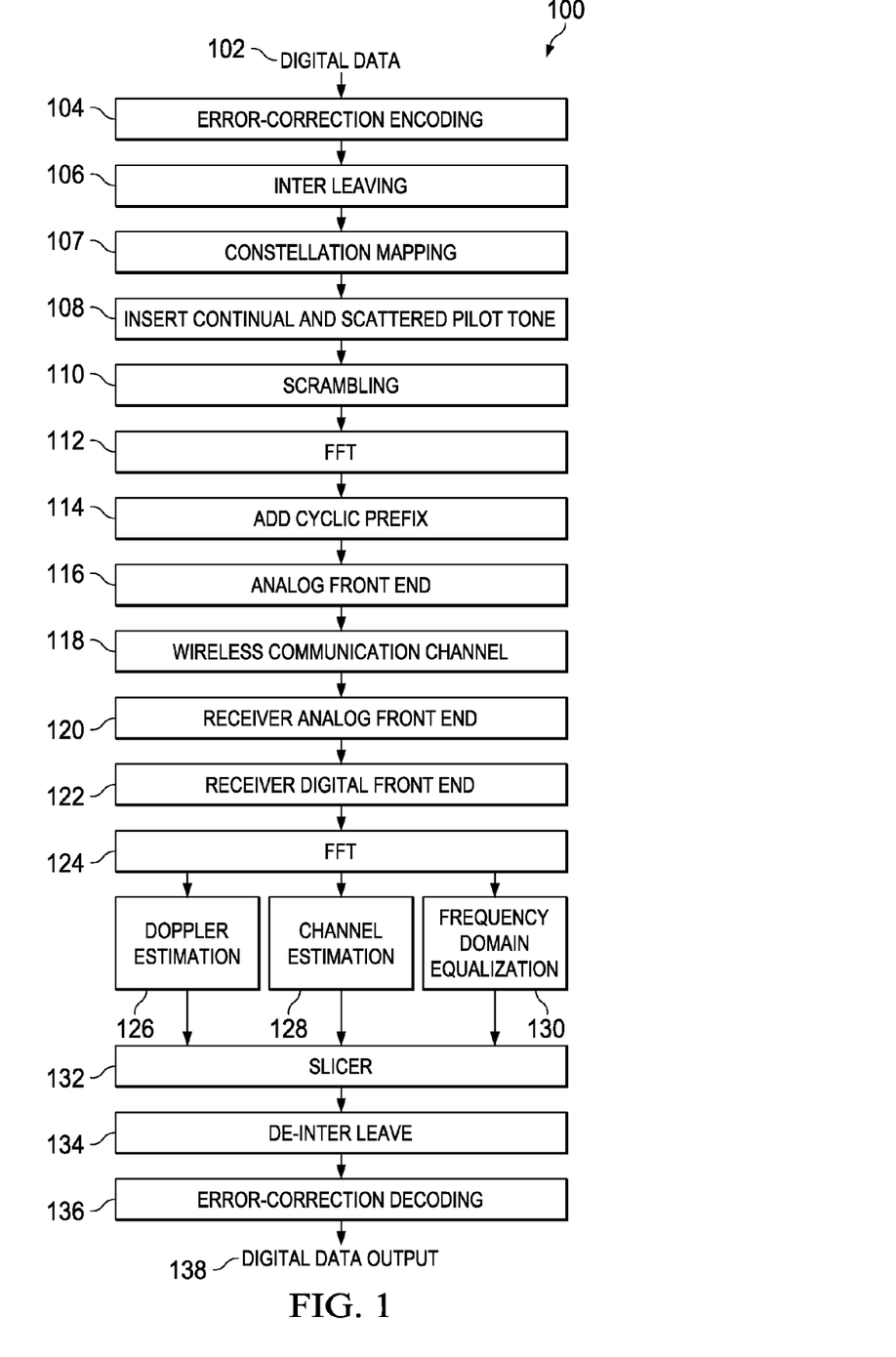
FIG. 1 is an embodiment depicting a block diagram for an Orthogonal Frequency-Division Multiplexing (OFDM) receiver.

FIG. 1 is an embodiment depicting a flow diagram for an Orthogonal Frequency-Division Multiplexing (OFDM) receiver data manipulation. Error-correction encoding 104 is performed on a digital data 102. The digital data 102 in interleaved and constellation mapping is performed 106 and continual and scattered pilot tone is inserted 108. The data is them scrambled 110 and Fast Fourier Transform (FFT) 112 is performed on it. Cyclic prefix is added 112. The data is received by an analog frond end 116 and sent to a wireless communication channel 118. A receiver analog front end and a receiver digital front end receive the data. FFT 124 is performed on the data and a portion or all the data is sent to a Doppler estimation 126 and channel estimation 128 and frequency domain equalization 130, where these steps may be performed in various order, simultaneously and/or dependent from one another and the output is then sliced in slicing 132. The data resulting from the slicer 134 is de-interleaved 134 and error-correction decoding 136 is performed to result in output digital data 138.

Figure 2:
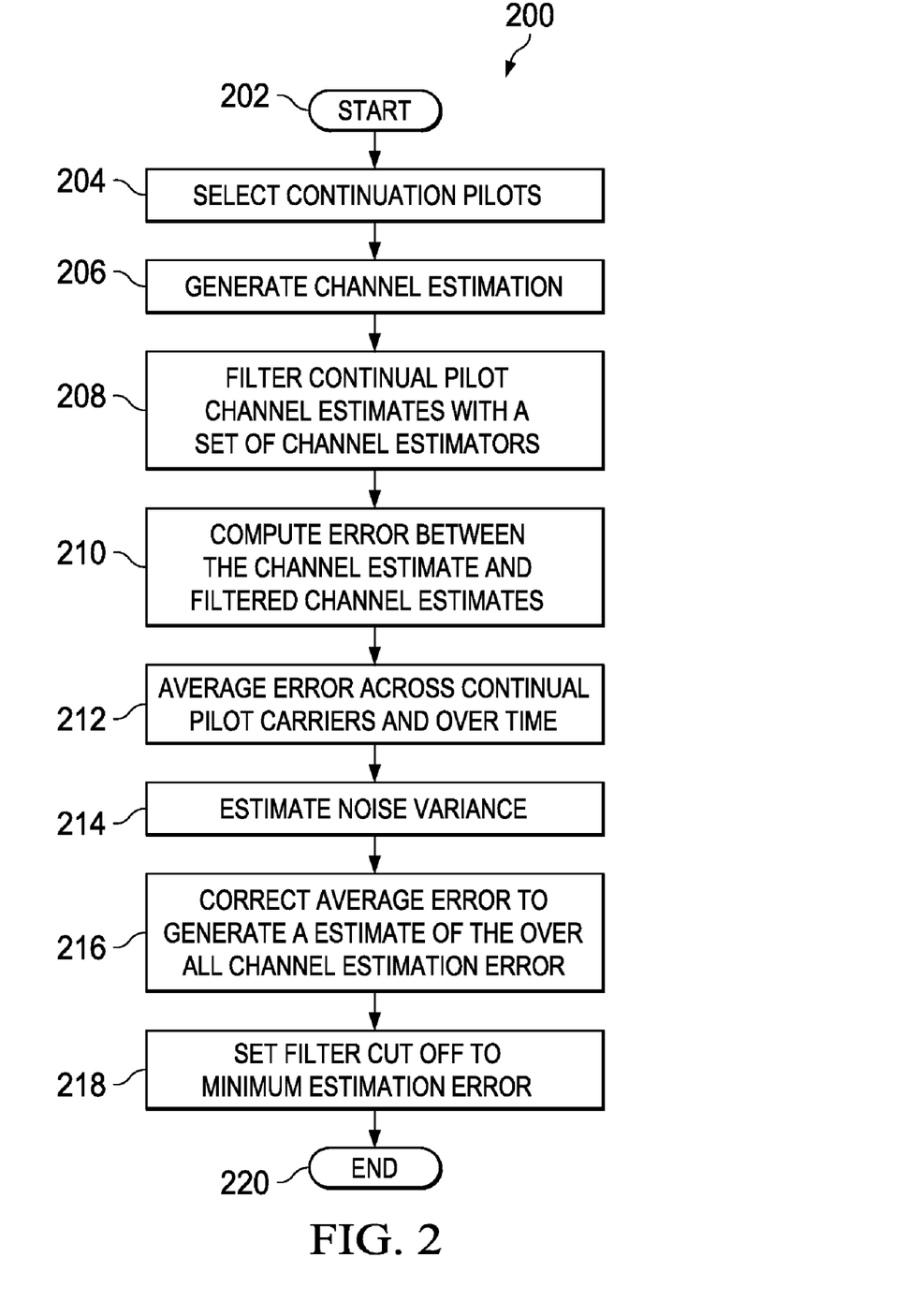
FIG. 2 is an embodiment depicting a method for setting filter cutoff in an Orthogonal Frequency-Division Multiplexing (OFDM) utilizing Doppler estimation.
Figure 3:
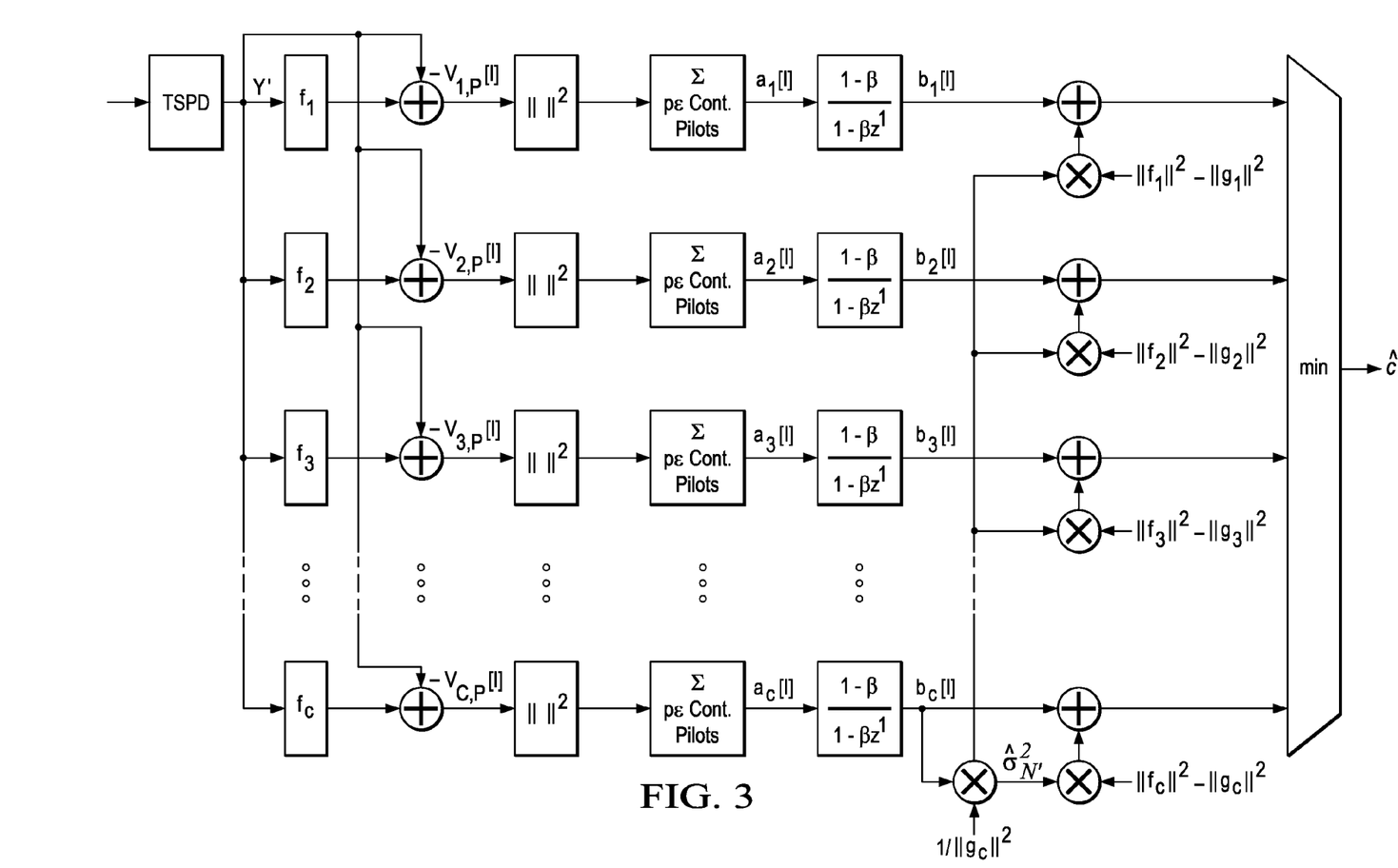
FIG. 3 is an embodiment depicting a block diagram of Doppler estimation algorithm.
Figure 4A:
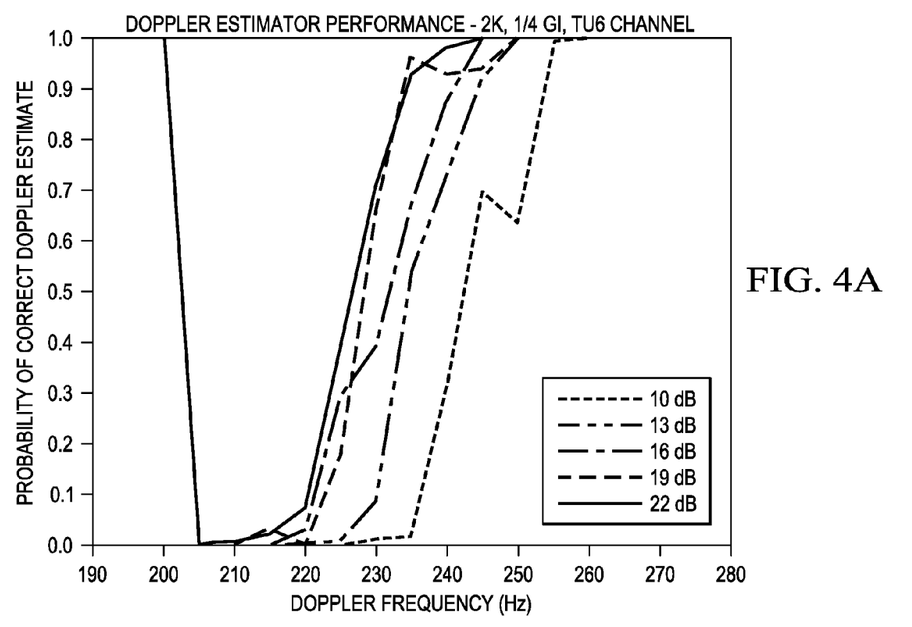
Figure 4B:
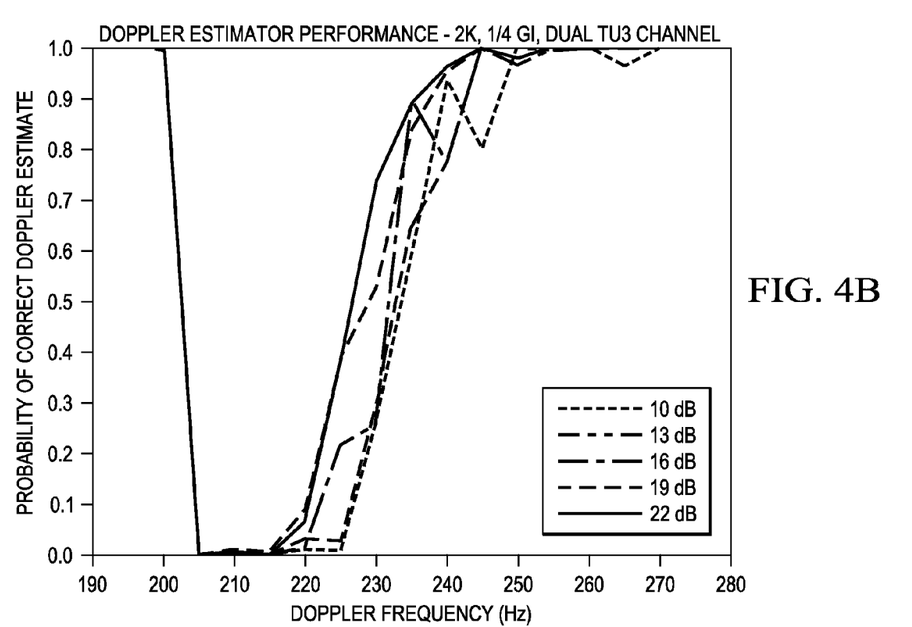
Figure 4C:
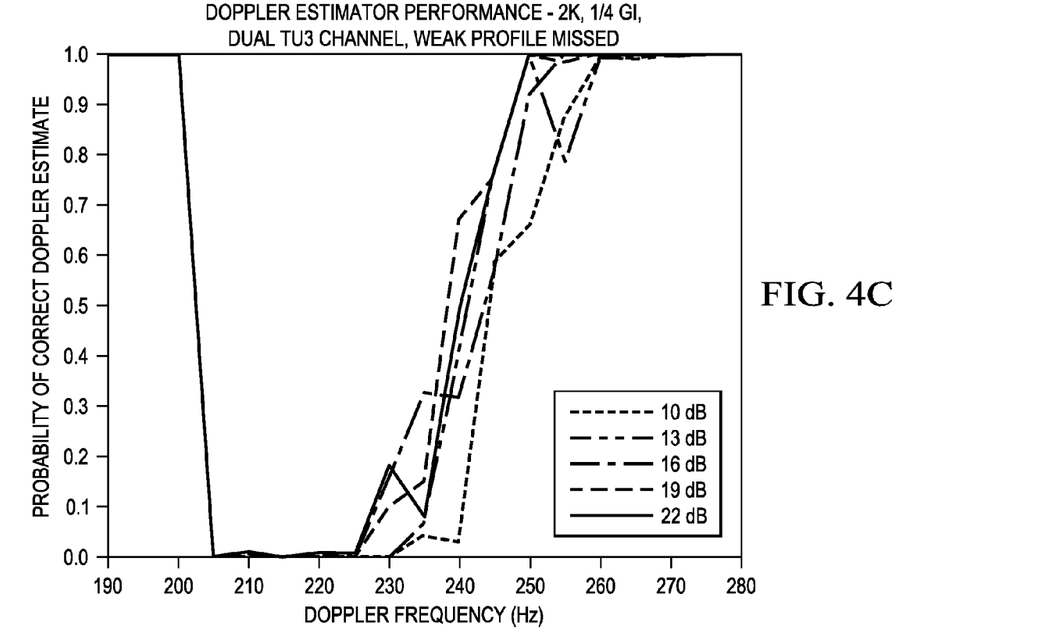
Figure 4D:
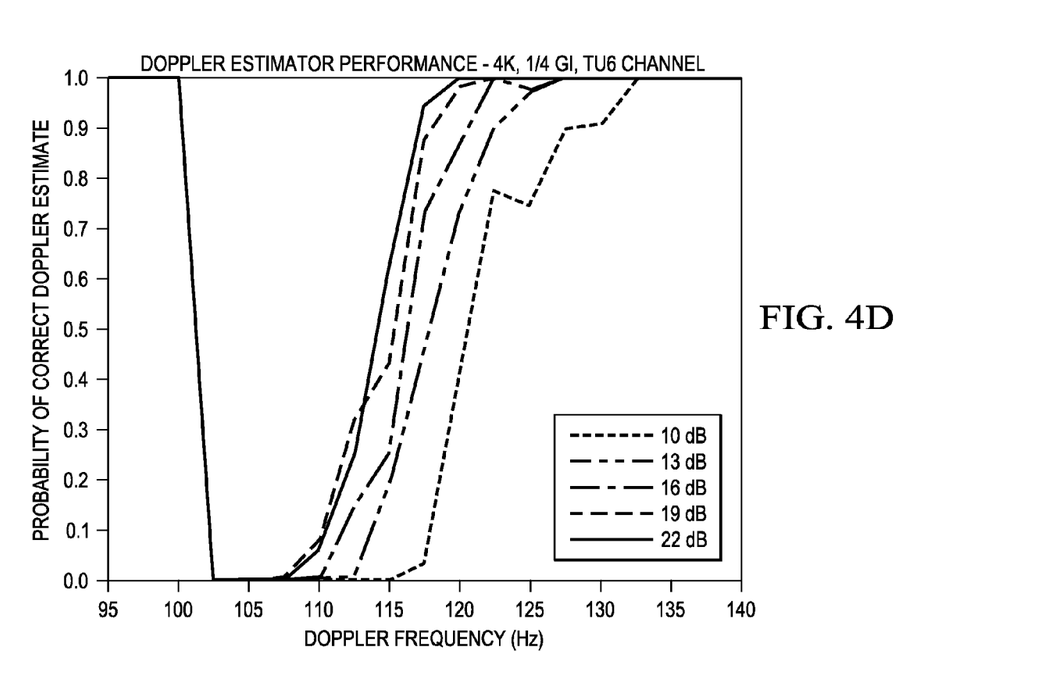
Figure 4E:
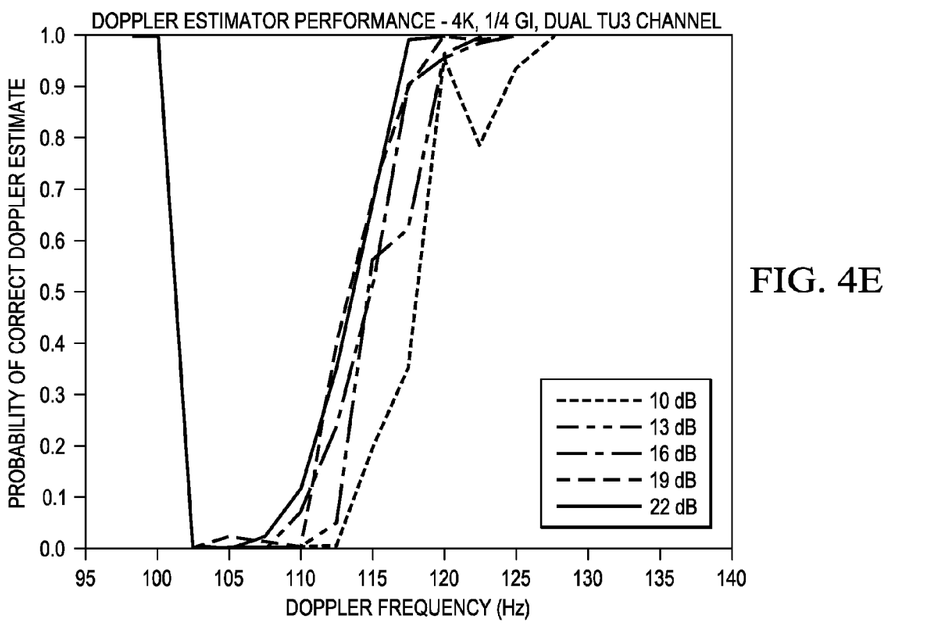
Figure 4F:
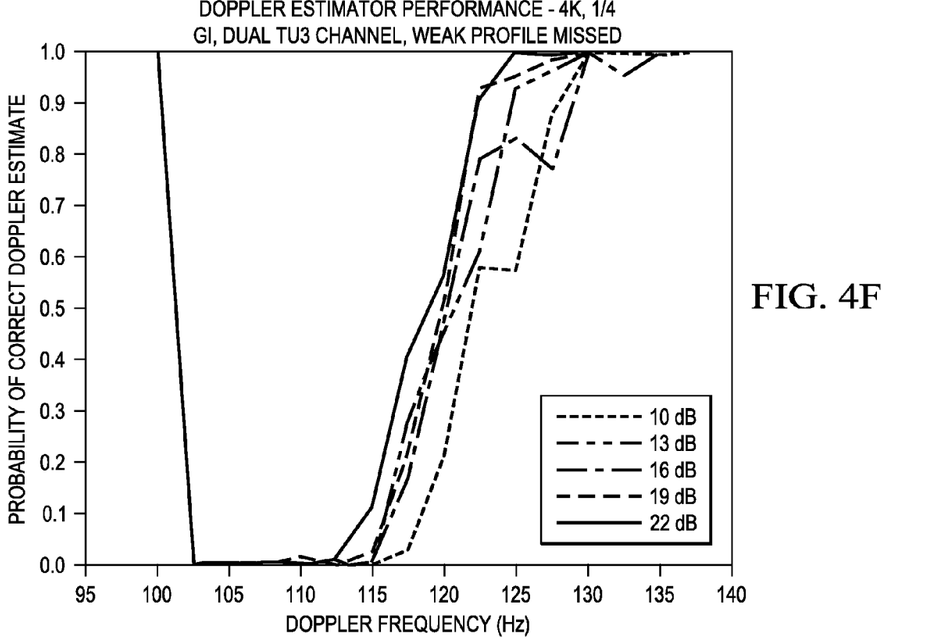
Figure 4G:
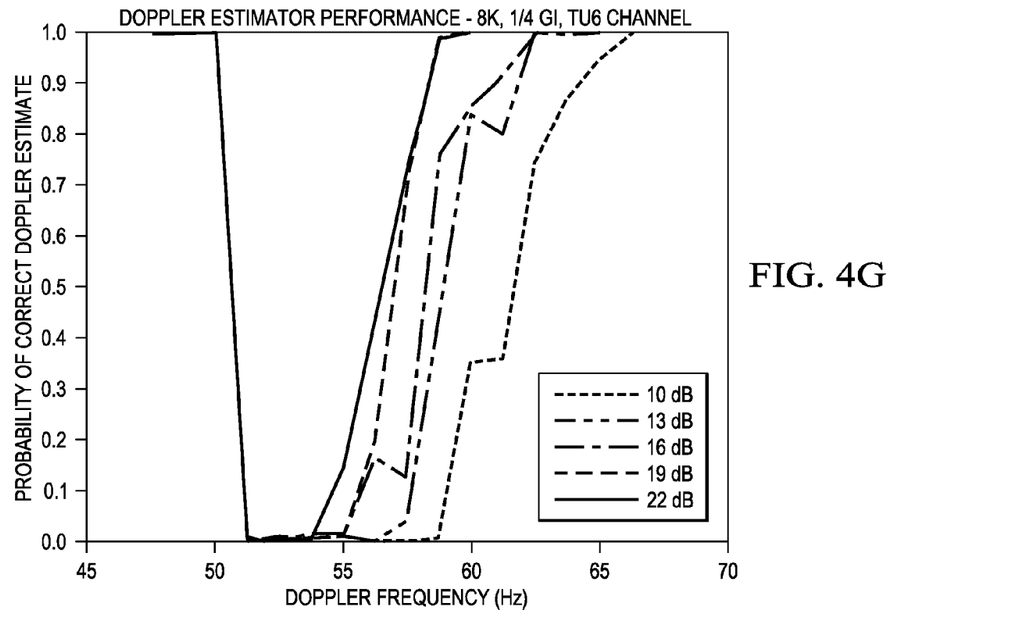
Figure 4H:
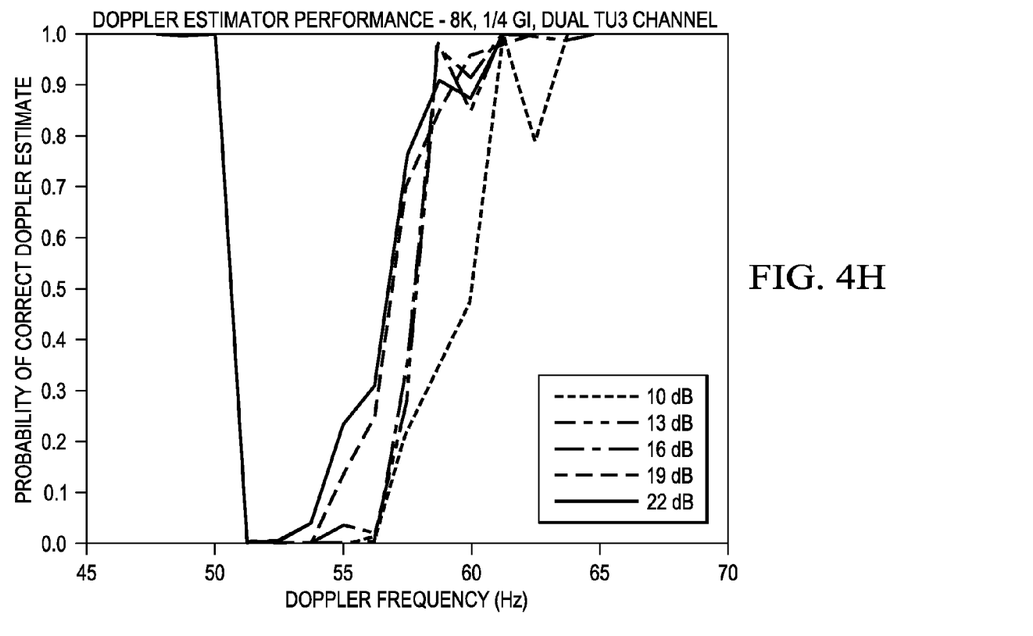
Figure 4I:
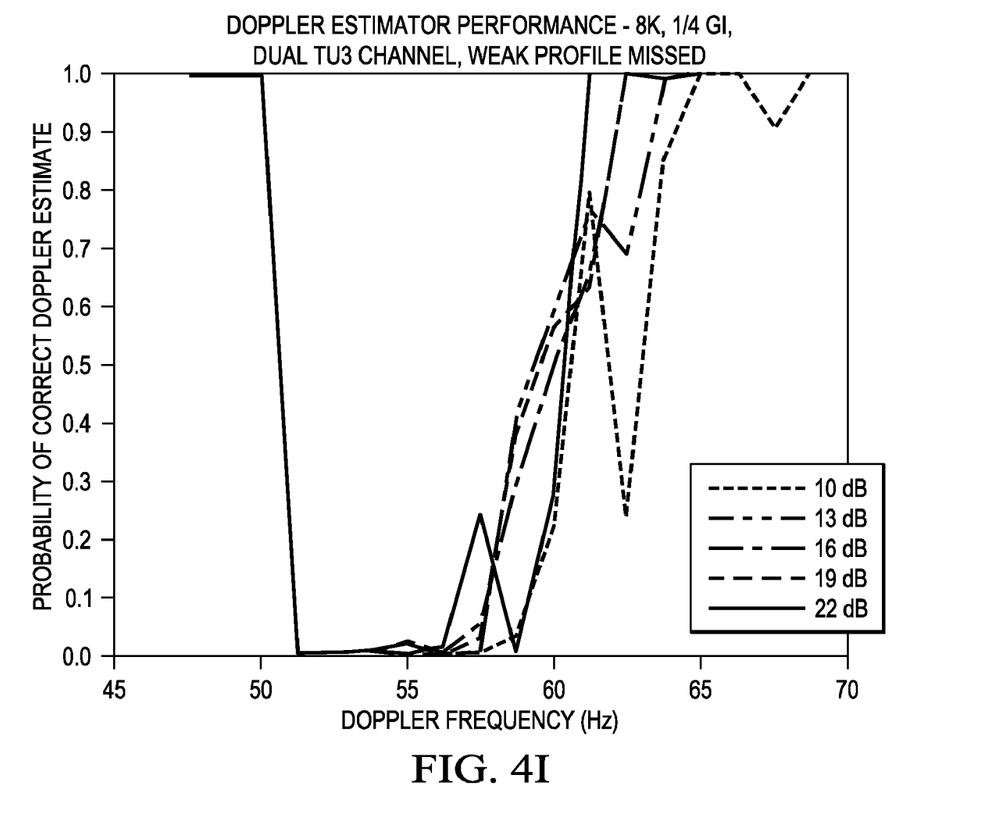

FIG. 2 is an embodiment depicting a method 200 for setting filter cutoff in an Orthogonal Frequency-Division Multiplexing (OFDM) utilizing Doppler estimation (shown in FIG. 3). The method 200 starts at step 202 and proceeds to step 204. At step 204 the selects a continuation pilots. At step 206, the method 200 generates channel estimation. At step 208, the method 200 filters continual pilot channel estimates with a set of channel estimators, each with different maximum Doppler shifts. At step 210, the method 200 computes the error between the channel estimation and the filtered channel estimates. At step 212, the method 200 averages the error across continual pilot carriers and averages error over time. At step 214, the method 200 estimates noise variance. At step 216, the method 200 corrects average error to generate an estimate of the overall channel estimator error. At step 218, the method 200 sets the filter cutoff to the minimum estimation error. The method 200 ends at step 420.

FIG. 3 is an embodiment depicting a block diagram of Doppler estimation algorithm. Doppler estimation in the receiver may insure that the introduction of ICI cancellation in DTV 2000 does not degrade performance in static or low mobility channels. The receiver may switch between the FEQ and ICI cancellation algorithms, selecting the best equalizer for the estimated Doppler frequency.

The channel Doppler spread describes how rapidly the channel changes across two Orthogonal Frequency-Division Multiplexing (OFDM) symbols. Let $F_d$ be the Doppler frequency. If $H_{l,k}$ represents the value of the channel matrix in tone k and symbol l, the spectrum of the sequence with fixed k and variable l is band-limited between $F_d$ and $-F_d$.

In the receiver, the sequence $H_{l,k}$ is estimated by filtering the Fast Fourier Transform (FFT) output at pilot tones. On a pilot tone, the transmitted data is generated by a pseudo-noise sequence known to both the transmitter and receiver. The FFT output on a pilot tone is given by $$Y_{l,P} = H_{l,P} X_P + W_{l,P} + ICI_{l,P} = H_{l,P} X_P + N_{l,P}.$$

Here, the sequences $W_{l,P}$ and $ICI_{l,P}$ represent the additive white Gaussian noise and total ICI. For simplicity, the sequence $N_{l,P}$ represents their sum.

On a continual pilot tone, $X_P$ is transmitted in every OFDM symbol. The channel can be estimated by a two step procedure. First, the phase and gain of $X_P$ can be removed from the FFT output by the tone separation and phase descrambling (TSPD) block of the receiver. The TSPD output is the sum of a sample of the channel $H_{l,P}$ and noise $N'_{l,P} = N_{l,P}/X_P$. The time series of channel estimates on a fixed continual pilot tone is band-limited, so it can be estimated by filtering with a low-pass filter (LPF) with cutoff frequency exceeding $F_d$. As such, the low-pass filter is applied to the sequence of frequency domain channel estimates over symbol indices, rather than across tone indices. The filtering removes white noise beyond this frequency.

Let $f_c[l]$ represent a low-pass filter impulse response with cutoff frequency given by $F_c$. If this filter is used to estimate the channel $H_{l,P}$ from the continual pilots, the residual estimation error for channel estimation is given by $$e_{c,P}[l] = H_{l,P} - f_c[l] * H_{l,P} + f_c[l] * N'_{l,P}.$$

Let $g_c[l] = \delta[l] - f_c[l]$ denote the high-pass error filter. The error can be re-written as $$e_{c,P}[l] = g_c[l] * H_{l,P} + f_c[l] * N'_{l,P}.$$

The variance of this error signal has two contributions. The first contribution comes from the pass-band ripple of the estimation filter applied to the desired signal, and the second comes from the filtered noise. If the average stop-band ripple for $g_c[l]$ is denoted by $r_c$, the error can be approximated by $$\sigma_{e_c,P}^2 \approx 2F_d r_c + \|f_c\|^2 \sigma_{N'}^2,$$

where $\sigma_{N'}^2$ represents the variance of $N'$. This expression assumes that the channel and noise are uncorrelated, the pass-band ripple can be approximated by $r_c$ across the entire frequency band between $-F_d$ and $F_d$, and filter cutoff frequency $F_c$ exceeds the Doppler frequency $F_d$. In case the filter cutoff is smaller than the Doppler frequency, the error can be approximated by $$\sigma_{e_c,P}^2 \approx 2F_c r_c + 2(F_d - F_c) + \|f_c\|^2 \sigma_{N'}^2.$$

The error due to the filter rejection of the channel energy above $F_c$ is assumed to be directly proportional to the portion of the Doppler spectrum outside the filter pass-band. This approximation becomes more accurate as the filter transition band becomes sharper. Thus, the residual channel estimation error rises rapidly as the Doppler frequency exceeds the filter cutoff frequency.

The Doppler estimation algorithm allows the receiver to switch between time interpolation filters and equalizers optimized for low Doppler or high Doppler operation. The Doppler can be estimated by choosing the best filter to estimate the channel. This can be accomplished by using a set of time interpolation filters to generate channel estimates for the continual pilot carriers in the OFDM symbol. Since the transmitted data is known, the error can be computed without any decision-directed, non-linear processing. The overall channel estimation error variance can be approximated by the time-average of the squared error produced by these filters.

The error estimate for filter c is given by $$v_{c,P}[l] = \begin{cases} (Y_{l,P}/X_P) - f_c[l] * (Y_{l,P}/X_P) \\ g_c[l] * H_{l,P} + g_c[l] * N'_{l,P} \end{cases}$$

This estimate differs from the true error because the noise sequence is filtered by $g_c[l]$ rather than $f_c[l]$. The time-average of the error estimate magnitude $\|v_{c,P}[l]\|^2$ does not converge to a consistent estimate of the true filtering error variance. Instead, its steady-state value can be approximated by $$\sigma_{v_c,P}^2 \approx \begin{cases} 2F_d r_c + \|g_c\|^2 \sigma_{N'}^2, & F_d \leq F_c \\ 2F_c r_c + 2(F_d - F_c) + \|g_c\|^2 \sigma_{N'}^2, & F_d > F_c. \end{cases}$$

This error estimate variance cannot be calculated directly because it depends upon the unknown parameter $\sigma_{N'}^2$. An estimate of the variance can be calculated using an IIR filter structure similar to the current DTV1000 noise variance estimation circuit. This structure estimates $\sigma_{v_c,P}^2$ in several steps. First, it computes $v_{c,P}[l]$ for the filter cutoff hypotheses $c = 1, \ldots, C$. The index c orders the filters with increasing cutoff frequencies. Second, the squared error for each continual pilot carrier is averaged across the whole OFDM symbol for each c. The averaged single-symbol squared error is $$a_c[l] = \left(\frac{1}{N_P}\right)\left(\sum_{P \in Cont.Pilots} \|v_{c,P}[l]\|^2\right),$$

where $N_P$ represents the number of continual pilots. Third, an IIR filter averages the C error statistics $a_1[l]$ to $a_C[l]$, producing secondary variance estimates. The resulting error estimates are given by $$b_c[l] = (1-\beta)b_c[l-1] + \beta a_c[l].$$

The time interpolation filter with the largest cutoff frequency, $f_C[l]$, is used to generate an estimate of the noise variance. Since it has the largest value of cutoff frequency, it can estimate the noise variance over a larger range than any of the other filters without $F_d > F_c$, where the bias increases rapidly. The raw noise variance estimate is given by $$\hat{\sigma}_{N'}^2[l] = \frac{b_C[l]}{\|g_C\|^2}.$$

This estimate is biased due to the stop-band ripple of the filter $g_C[l]$. The bias is given by $2F_d r_C/\|g_C\|^2$. To simplify the approximation, we shall assume that the ripple is constant over all of the filters, and can be denoted by r.

The approximate filtering variance for each channel estimation filter is estimated by $$\hat{\sigma}_{e_c}^2[l] = b_c[l] + \hat{\sigma}_{N'}^2[l](\|f_c\|^2 - \|g_c\|^2).$$

The value of $b_c[l]$ has the noise variance weighted by $\|g_c\|^2$, so this estimate attempts to subtract that term and replace it with the noise variance estimate weighted by $\|g_c\|^2$, as it appears in the true expression for $\sigma_{e_c}^2$.

The Doppler estimation algorithm chooses the index for the time interpolation filter that minimizes the estimated channel estimation error. It can be expressed as $$\hat{c} = \arg\min \hat{\sigma}_{e_c}^2.$$

The Doppler estimate generated by this algorithm is the cutoff frequency used to design the associated time interpolation filter, or $F_{\hat{c}}$.

The approximate mean of $\hat{\sigma}_{e_c}^2[l]$ is given by $$m_{e_c}^2 \approx \begin{cases} r + \|g_c\|^2 \sigma_N^2 + \left(\frac{r + \|g_c\|^2 \sigma_N^2}{\|g_c\|^2}\right)(\|f_c\|^2 - \|g_c\|^2) \\ r\left(1 + \frac{\|f_c\|^2 - \|g_c\|^2}{\|g_c\|^2}\right) + \|f_c\|^2 \sigma_N^2. \end{cases}$$

Since the sequences $$\|f_c\|^2 \text{ and } \left(1 + \frac{\|f_c\|^2 - \|g_c\|^2}{\|g_c\|^2}\right)$$

increase monotonically with c, the approximate mean values of the final channel estimation error metric are increasing with $F_c$, and the decision rule picking the smallest metric is likely to choose the metric associated with the filter having the smallest cutoff frequency exceeding $F_d$.

In one embodiment, the estimation algorithm works over a wide range of noise variances. For high spectral efficiency modes, such as, with 16-QAM constellations and a rate 2/3 convolutional code, the typical noise variance can be as small as $\sigma_N^2=0.01$. In a low spectral efficiency mode, such as, with QPSK constellations and a rate 1/2 convolutional code, the noise variance can be as large as $\sigma_N^2=0.2$. If the ripple r is too small, the second term in the equation for $m_{e_c}^2$, given by $\|f_c\|^2 \sigma_N^2$, dominates the error expression mean. This can lead the detection algorithm to choose a filter with $F_c<F_d$. In practice, this error can be avoided by designing the time interpolation filters with a larger ripple. It has been found that the time interpolation filters produced by the MMSE design criterion with the noise variance assumed to be $\sigma_N^2=0.25$ yield accurate Doppler estimates for CNRs above 8 dB.

The Doppler estimation algorithm has been evaluated over a range of operating conditions. The tests varied the OFDM mode, channel type, and carrier-to-noise ratio (CNR) for the receiver input. The tests were run for all three OFDM symbol sizes (2K, 4K, and 8K) with the 1/4 guard interval (GI) used for every test.

The algorithm was tested for three static channels—AWGN, Portable, and two-path profiles. Additionally, it was tested for three fading channels—TU6, Dual TU3, and Dual TU3 with bad placement. The individual profiles in the Dual TU3 channel model were separated by 80% of the GI duration. The energies of the two profiles were scaled so that the first profile was a pre-echo 15.5 dB below the second profile. When bad placement was added to the Dual TU3 profile, the FFT window placement was biased to center the window on the strong profile.

The filters used in the Doppler estimation algorithm were designed with the noise variance prior set to $\sigma_N^2=0.2$. For the 8K OFDM mode, two bins were used for the Doppler estimator. The time interpolator for the low frequency bin was designed with a cutoff frequency set to 50 Hz. The time interpolator for the high frequency bin was designed with a cutoff frequency set to 150 Hz. The cutoff frequencies for the 2K and 4K modes were scaled appropriately. The filters used 16 taps regardless of the OFDM mode.

The IIR filters used to average $a_c[l]$ were designed with $\beta=1/16$. There was a total of 24 symbols of latency allowed for the time interpolation filter transient and IIR filter transients to die out.

The Doppler estimator was simulated for 400 realizations at CNR ranging between 10 dB and 22 dB. The estimator was configured to choose between two hypotheses—a low-Doppler hypothesis and a high-Doppler hypothesis. If the low Doppler hypothesis is true, the Doppler frequency is between 0 Hz and 50 Hz in the 8K OFDM mode, for example. In this mode, the FEQ does a better job of equalizing the channel than the ICI cancellation algorithm. If the high Doppler hypothesis is true, the Doppler frequency exceeds 50 Hz in the 8K OFDM mode, and the ICI cancellation algorithm best equalizes the channel.

FIG. 4A-I is an embodiment of simulation results for the Doppler estimator. The simulations tested whether the Doppler estimator chose the low Doppler or high Doppler hypothesis for combinations of Doppler frequency and CNR. Note that the Doppler estimation algorithm is fully accurate for frequencies below the 50 Hz bin cutoff and above 65 Hz. Between these two frequencies the estimator may choose an incorrect bin. In this region, however, the performance of the FEQ and ICI cancellation algorithm are similar, so there is little impact on receiver performance.

While the foregoing is directed to embodiments of the present invention, other and further embodiments of the invention may be devised without departing from the basic scope thereof, and the scope thereof is determined by the claims that follow.

What is claimed is:

1. A method for estimating Doppler channel in an Orthogonal Frequency-Division Multiplexor, comprising:
   selecting a continuation pilot;
   generating a channel estimation;
   filtering the continual pilot with at least one channel estimator;
   computing the error between the channel estimation and a filtered channel estimates;
   averaging the error across continual pilot carriers and over time;
   estimating noise variance;
   correcting average error utilizing the estimated noise variance to generate an estimate of the overall channel estimator error; and
   setting the filter cutoff to minimum estimation error.

2. The method of claim 1, wherein the at least one channel estimator utilized in filtering the continual pilot have different maximum Doppler shifts.

3. An Orthogonal Frequency-Division Multiplexor, comprising:
   means for selecting a continuation pilot;
   means for generating a channel estimation;
   means for filtering the continual pilot with at least one channel estimator;
   means for computing the error between the channel estimation and the filtered channel estimates;
   means for averaging the error across continual pilot carriers and over time;
   means for estimating noise variance;
   means for corrects average error utilizing the estimated noise variance to generate an estimate of the overall channel estimator error; and
   means for setting the filter cutoff to minimum estimation error.

4. The Orthogonal Frequency-Division Multiplexor of claim 3, wherein the at least one channel estimator utilized in filtering the continual pilot have different maximum Doppler shifts.

5. A non-transistory computer readable medium comprising software that, when executed by a processor, causes the processor to perform a method comprising:
- selecting a continuation pilot;
- generating a channel estimation;
- filtering the continual pilot with at least one channel estimator;
- computing the error between the channel estimation and a filtered channel estimates;
- averaging the error across continual pilot carriers and over time;
- estimating noise variance;
- correcting average error utilizing the estimated noise variance to generate an estimate of the overall channel estimator error; and
- setting the filter cutoff to minimum estimation error.

6. The method of claim 5, wherein the at least one channel estimator utilized in filtering the continual pilot have different maximum Doppler shifts.

* * * * *